United States Patent [19]
Patterson et al.

[11] Patent Number: 6,038,963
[45] Date of Patent: Mar. 21, 2000

[54] DISPOSABLE BEVERAGE BREWING SYSTEM

[75] Inventors: Robert Patterson, Winneconne; Rebecca E Whitmore, Chilton; Debra D. Bowers, Menasha; Dean P. Swoboda, DePere, all of Wis.

[73] Assignee: Fort James Corporation, Deerfield, Ill.

[21] Appl. No.: 09/152,051

[22] Filed: Sep. 11, 1998

Related U.S. Application Data

[60] Provisional application No. 60/058,560, Sep. 11, 1997.

[51] Int. Cl.⁷ ..................................................... A47J 31/06
[52] U.S. Cl. ................................ 99/287; 99/322; 99/319; 99/323
[58] Field of Search ............................. 99/279, 287, 295, 99/317, 318, 319, 322, 323, 323.3

[56] References Cited

U.S. PATENT DOCUMENTS

| | | | |
|---|---|---|---|
| D. 287,217 | 12/1986 | Napier | D7/400 |
| 305,805 | 9/1884 | Dyer . | |
| 919,583 | 4/1909 | Houck . | |
| 1,238,759 | 9/1917 | Gonsalves | 99/323 X |
| 2,743,664 | 5/1956 | Dale | 99/295 |
| 2,885,290 | 5/1959 | Krasker . | |
| 3,266,411 | 8/1966 | Oakley | 99/304 |
| 3,370,524 | 2/1968 | Kasakoff . | |
| 3,483,812 | 12/1969 | Gast et al. | 99/295 |
| 4,086,848 | 5/1978 | Hahn | 99/323 |
| 4,325,905 | 4/1982 | Takahashi | 264/516 |
| 4,442,948 | 4/1984 | Levy et al. | 220/90.2 |
| 4,446,158 | 5/1984 | English et al. | 99/295 |
| 4,619,830 | 10/1986 | Napier | 426/82 |
| 4,981,588 | 1/1991 | Poulallion | 271/474 |
| 5,125,327 | 6/1992 | Winnington-Ingram | 99/306 |
| 5,424,083 | 6/1995 | Lozito | 426/82 |
| 5,545,879 | 8/1996 | Brotz | 219/689 |
| 5,605,089 | 2/1997 | Yu | 99/306 |
| 5,605,710 | 2/1997 | Pridonoff et al. | 426/86 |

FOREIGN PATENT DOCUMENTS

| | | |
|---|---|---|
| 0 006 014 | 12/1979 | European Pat. Off. . |
| 0 112 086 | 6/1984 | European Pat. Off. . |
| 2 556 201 | 6/1985 | France . |
| 2 651 664 | 3/1991 | France . |
| 559 025 | 2/1975 | Switzerland . |
| 451 197 | 7/1936 | United Kingdom . |
| 2 250 425 | 6/1992 | United Kingdom . |
| WO96/05760 | 2/1996 | WIPO . |

*Primary Examiner*—Reginald L. Alexander
*Attorney, Agent, or Firm*—Burns, Doane, Swecker & Mathis, L.L.P.

[57] ABSTRACT

A disposable filter press device for making a brewed beverage from a combination of liquid and material to be brewed includes a first disposable cup and a second disposable cup. The first disposable cup has a closed bottom, an open top and a sidewall extending around the entire circumferential extent of the first cup, while the second disposable cup is sized and configured to be positioned in the first cup. The second cup has a bottom end, an open top and a sidewall extending around the entire circumferential extent of the second cup. The second cup also includes a filter for filtering the brewed beverage from the material used to brew the brewed beverage as the second cup is moved relative to the first cup. The filter press device can also be provided with a mechanism for connecting the second cup to the first cup with the second cup being in an inverted, bottom end up position. The filter press device provides enhanced beverage taste over conventional drip brewed coffee, coffee ground or tea leaf separation from the brewed beverage, a spill proof closure of the brewed beverage cup, and improved insulation and structural rigidity of the cup both during and after brewing. Also, single-cup brewing, disposability and convenience are realized.

25 Claims, 10 Drawing Sheets

DISPOSABLE BEVERAGE BREWING SYSTEM

This application claims priority under 35 U.S.C. § 119(e) with respect to U.S. provisional Application No. 60/058,560 filed on Sep. 11, 1997, the entire content of which is incorporated herein by reference.

FIELD OF THE INVENTION

The present invention generally relates to a disposable beverage brewing system. More particularly, the present invention pertains to a filter press device for the single-cup brewing of a beverage, such as coffee from grounds or tea from leaves, wherein-the filter press substantially separates the brewed beverage from the coffee grounds or tea leaves. The filter press is made of materials which make it economical for disposable, single-cup brewing.

BACKGROUND OF THE INVENTION

The preparation of a quantity of coffee sufficient to fill several cups by means of a press brew apparatus is known. The brewed coffee is then dispensed into cups. Typically, the apparatus is made of rigid materials such as metal, glass, rigid plastic and the like. Rigidity is required to prevent deformation of the plunger-type filter as the coffee grounds are separated from the brewed coffee.

WO 96/05760 relates to a "single-cup" plunger filter apparatus having a drinking vessel in the form of a cup and a plunger assembly including a filter element. The drinking vessel has a cylindrical side wall, a bottom and a handle. The handle includes a driving member extending parallel to and adjacent to the interior side wall surface of the vessel and cooperating with the vessel to guide the filter element so that the filter element remains horizontal during plunging. The filter element is attached to the driving member and is adapted at its periphery to slidably and sealingly engage the cylindrical side walls of the vessel.

In normal use, ground coffee or tea leaves are first placed into the drinking vessel. Boiling water is then added to the vessel and stirred. Alternatively, the water is boiled in the drinking vessel and then the coffee grounds or tea leaves are added. The coffee or tea is permitted to brew for the desired time. When brewing is complete the plunger assembly having the filter element is inserted into the vessel. The handle is depressed pushing the filter element through the liquid. The coffee grounds or tea leaves are pushed towards the bottom of the vessel and are trapped between the filter element and the bottom of the vessel. The user can drink directly from the vessel. Prior to reuse, the plunger must be removed and the vessel must be emptied and cleaned of coffee grounds or tea leaves.

U.S. Pat. No. 2,743,664 to Dale relates to a single-use disposable coffee brewer. The brewer includes a disposable first receptacle containing a charge of coffee, tea, or the like, capable of serving as the upper part of a 'drip' type brewer. The receptacles are nestable for storage. A second receptacle serves as a receiver for the beverage and as a cup from which it may be drunk. The two receptacles may be separably joined together in a stacked fashion. In a further embodiment, the first receptacle is provided with a plurality of cut-out tabs at the bottom of the side so that when extended radially, the first receptacle may rest upon the top rim of the second receptacle.

The first receptacle has an open top and a perforated bottom. The bottom contains a chamber which is prefilled with a charge of coffee grounds, tea leaves or other ingredients from which a beverage is to be made. Hot water is poured into the first receptacle and permitted to pass through the charge into a second receptacle which can be a disposable or non-disposable container. When all the hot water has run through the charge, the first receptacle may be thrown away.

The coffee brewer is of the "drip" type and therefore lacks the improved flavor provided by a "press" type brewer. Further, the chamber is required to be pre-filled with a charge of coffee or have a pre-packed charge inserted herein.

SUMMARY OF THE INVENTION

In accordance with the present invention, there is provided a disposable filter press for the single-cup brewing of a beverage, wherein the filter press substantially separates the brewed beverage from the grounds or leaves. The present invention also provides a disposable filter press brewing system having a nestable double-lid. In addition the present invention provides a disposable filter press which can accommodate freshly ground coffee beans so that shops offering many different flavors which only brew a few flavors at a time can provide the filter press brewing of a wide variety of flavors.

According to the present invention, a disposable filter press device for making a brewed beverage from a combination of liquid and material to be brewed includes a disposable first cup having a closed bottom, an open top and a sidewall extending around the entire circumferential extent of the first cup. In addition, the filter press device includes a disposable second cup having a bottom end, an open top and a sidewall extending around the entire circumferential extent of the second cup. The sidewall of the second cup is sized and configured substantially the same as the sidewall of the first cup so that the second cup is positionable in the first cup. The second cup is also provided with a filter for separating the brewed beverage from the material that is used to brew the brewed beverage by moving the second cup relative to the first cup.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE INVENTION

The present invention provides a disposable, one-time use, filter press device for single-cup brewing of a beverage from ground coffee, tea leaves, or the like, wherein the filter press substantially separates the brewed beverage from the material from which it is brewed. The filter press device is preferably in the form of a cup adapted to be fitted in another cup, with the cups being made of paper or other disposable material which may be laminated with polyethylene and the like, thus being suitable for single-cup use. In one embodiment, the filter press brewing is obtained by the use of a filter press cup which remains as part of the cup and forms a leak-proof seal therewith. In another embodiment, the filter press cup is removed prior to drinking. Thus, the invention provides for two types of substantially complete separation of grounds, one wherein the filter press cup is operated by a downward motion and another wherein the filter press cup is operated by an upward motion. The filter press cup can be constructed in one of several ways. For example, the filter cup can be a disposable cup (e.g., paper cup) that is slightly modified by providing an open bottom and/or slots in the cup sidewall, with the open bottom and/or sidewall slots being covered with a filter. Alternatively, a disposable cup can be modified by providing a plurality of through holes distributed throughout the cup sidewall and/or bottom. Another possibility is to form the holes in the cup at the time the cup is manufactured. Another feature of the invention is a nestable lid with multiple mounting elements wherein the container can be sealed, detached and inverted and then sealed again.

Generally speaking, the filter press device of the present invention is designed to be used by mixing boiling water with coffee grounds, tea leaves or other material that is to be brewed, with the material being permitted to brew for a desired length of time. The material to be brewed and the boiling water are mixed in one of the cups forming the filter press device. The coffee grounds, tea leaves or other material being brewed are then separated from the liquid beverage by pressing the filter portion of the filter press device through the mixture. The filter press portion is then either secured in a leak-proof fashion to the cup or removed (depending on which type is used) prior to drinking.

Figure 1A:
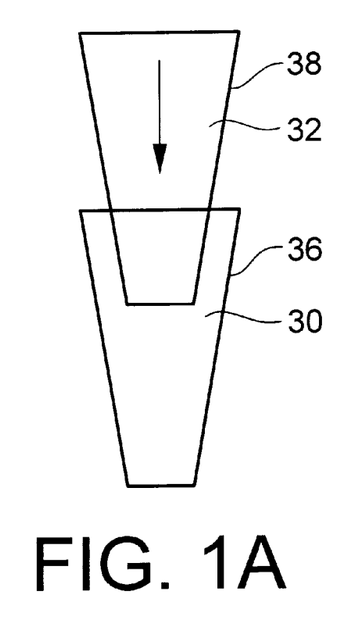
FIG. 1A is a side view of a filter press device according to one embodiment of the present invention.

With reference to FIG. 1A which illustrates a first embodiment of the invention, the filter press device includes a first cup 30 to which is added water and the material to be brewed, for example coffee grounds, tea leaves or other like material. The cup 30 can be any suitable disposable cup for consuming a brewed beverage. The water is either hot upon addition to the cup 30 or can be heated (e.g., by microwave heating) in the cup 30 after addition to the cup.

Figure 1B:
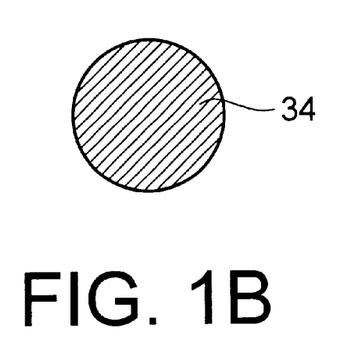
FIG. 1B is a bottom view of the second cup used in the filter press device illustrated in FIG. 1A.

The filter press device also include a filter press in the form of a second cup 32 that is adapted to fit within the first cup 30. The second cup 32 is preferably sized and configured to be substantially the same as the first cup 30 so that the second cup 32 can be pushed into the first cup 30, with the bottom of the second cup 32 being located closely adjacent the bottom of the first cup 30. The second cup 32 can also be made of the same material as the first cup 30. Both the first cup 30 and the second cup 32 possess open tops and also include an upstanding side wall 36, 38 that extends circumferentially around the entire cup. The bottom end of the first cup 30 is closed whereas the bottom of the second cup 32 is open. As seen in FIG. 1B, a filter 34 extends across the open bottom end of the filter press cup or second cup 32.

As noted above, the material to be brewed (e.g., coffee grounds, tea leaves, etc.)and water are placed in the first cup 30. The mixture of water and the material to be brewed in the first cup 30 is allowed to brew for as long as the drinker desires, depending upon, for example, the individual's taste for the strength of the brewed beverage. Once the brewing of the beverage is complete, the filter press cup 32 is pushed into the first cup 30. The brewed beverage thus flows from the first cup 30 to the second cup 32 by way of the filter 34 in the second cup 32. The material originally placed in the first cup 30 for making the brewed beverage is trapped between the outer first cup 30 and the inner filter press cup or second cup 32. The brewed beverage can thus be consumed without the need for removing the inner filter press cup 32.

This design provides the advantage of enhancing the insulating properties through the use of double cupping. Also, the strength of the resulting beverage cup is increased because of the dual sidewalls.

As noted above, the filter press cup 32 is sized and configured to be substantially the same as the size and configuration of the first cup 30. More particularly, the filter press cup 32 should be sized so that the second cup 32 can be pushed into the first cup 30 a distance sufficient to effect the filter press operation. For example, the filter press cup 32 should be capable of being inserted into the first cup 30 so that the bottom of the second cup 32 is able to contact or almost contact the bottom of the first cup so as to sufficiently accommodate the presence of the material being brewed (e.g., coffee grounds, tea leaves, etc). This will help facilitate the filter press operation and will help effectively trap the material originally placed in the first cup 30 during consumption of the brewed beverage. Also, by sizing and configuring the first and second cups 30, 32 to be substantially the same, the second cup 32 tightly fits within the first cup 30 so that during consumption of the beverage, the beverage does not readily flow between the outer surface of the second cup 32 and the inner surface of the first cup 30.

The filter 34 on the bottom of the filter press cup 32 can be made of any suitable type of filter material and design which provides the combination of a suitable flow through rate and substantial separation of the brewed beverage and the material from which the brewed beverage is made (e.g., coffee grounds, tea leaves, etc.). Possible filter materials include, but are not limited to, paper material (e.g., airlaid, through air dried, conventional, natural or synthetic fibers), synthetic screen, cloth material, and the above materials with holes.

Figure 2:
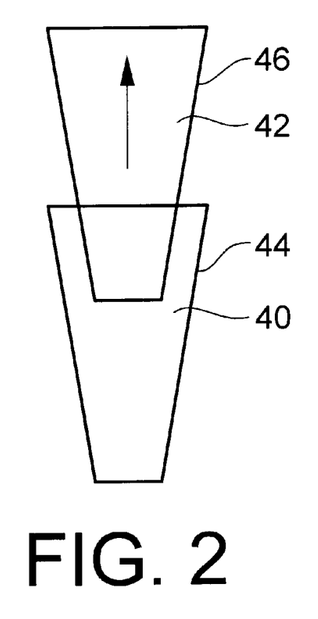
FIG. 2 is a side view of another embodiment of the present invention.

FIG. 2 illustrates an alternative version in accordance with the present invention that includes a first cup 40 and a second cup 42. The construction of the two cups 40, 42 is the same as in the embodiment described above. In this embodiment, the second cup 42 is adapted to be placed in the first cup 40 prior to adding the hot water and the material to be brewed (e.g., coffee grounds, tea leaves, etc,). Both the first cup 40 and the second cup 42 include an upstanding sidewall 44, 46 that extends circumferentially around the entire cup. The bottom end of the second cup 42 is open and a filter extends across the open bottom end of the second cup 42 in the same manner as illustrated in FIG. 1B.

In use, hot water and the material to be brewed (e.g., coffee grounds, tea leaves, etc.) are placed in the second cup 42 and stirred. After brewing for the desired time, the inner second cup 42 is slowly lifted out of the outer first cup 40 and discarded. The brewed beverage then remains in the first cup 40. In this embodiment, the material from which the brewed beverage is made is removed from contact with the brewed beverage prior to consumption.

Figure 3A:
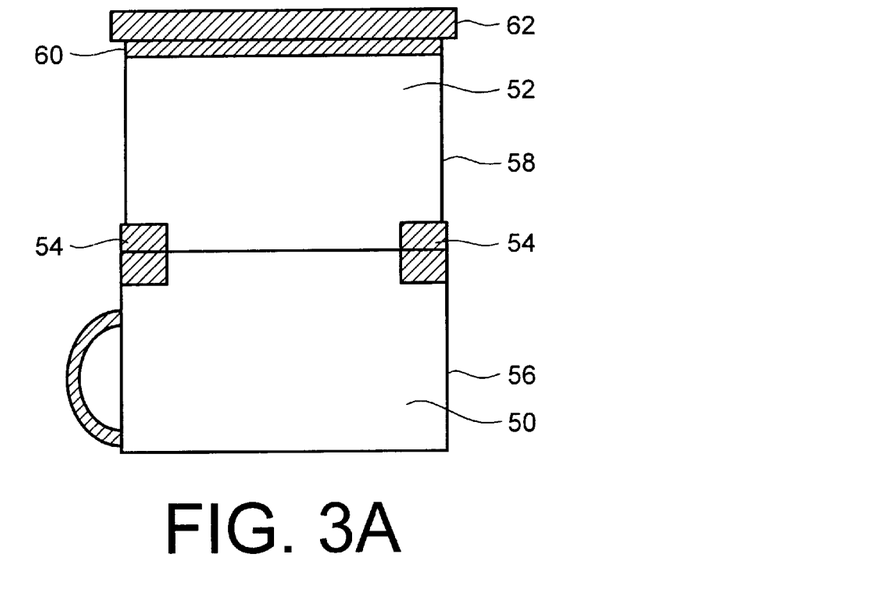
FIG. 3A is a side view of a filter press device according to another embodiment of the present invention.

Another embodiment of the filter press device according to the present invention is shown in FIG. 3A and includes a first outer cup 50 and a second inner cup or filter press cup 52. In this embodiment, both the first cup 50 and the filter press cup 52 are cylindrical in shape, as opposed to the tapering conical shape of the cups in the above-described embodiments. In addition, the filter press cup 52 is slightly smaller in outside diameter than the first cup 50 so that the filter press cup 52 can be placed within the first cup 50 during brewing and consumption of the brewed beverage.

FIG. 3A shows the filter press cup 52 stacked on top of the first cup 50 prior to use, with the filter press cup 52 being in an inverted bottom end up position. Locking mechanisms 54 can be provided to connect the two cups 50, 52 to one another in the manner shown in FIG. 3A while also allowing the second cup 52 to be separated from the first cup 50. The locking mechanisms can be in the form of partial rings that are sized to tightly engage the top end of both cups 50, 52. The locking mechanisms can also be in the form of a dual lid as described below in connection with various other embodiments of the present invention.

Both of the cups 50, 52 include a sidewall 56, 58 that extends circumferentially around the entire cup. The first cup 50 includes an open top end and a closed bottom end, whereas the second cup 52 possesses an open top end and an open bottom end. A filter 60 extends across the open bottom end of the filter press cup 52 and a lid 62 is adapted to be mounted on the bottom end of the second cup 52.

Figure 3B:
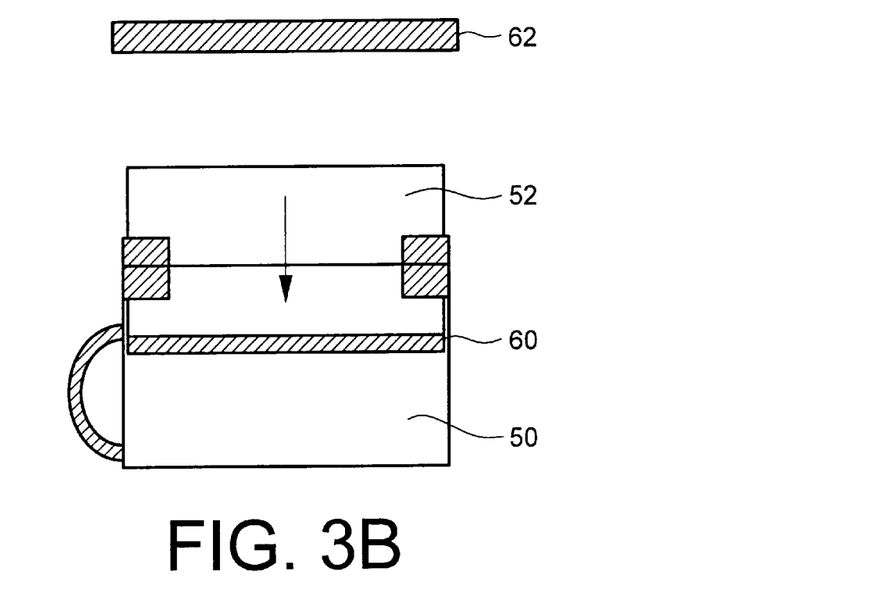
FIG. 3B is a side view of the filter press device illustrated in FIG. 3A when the second cup is inserted into the first cup.

The first cup 50 is adapted to contain water and the material to be brewed (e.g., coffee grounds, teal leaves, etc.). In use, the second cup 52 is separated from the first cup 50, and the material to be brewed and water (either hot or cold) are then added to the first cup 50. The second cup 52 can then be placed on the first cup 50 in the inverted position shown in FIG. 3A. In this way, the second cup 52 acts as a lid for the first cup and the locking mechanisms 54 help keep the two cups 50, 52 tightly together. If the water placed in the first cup 50 is cold, microwave heating can be performed to heat the water. After allowing sufficient time for brewing to occur, the lid 62 on the bottom of the second cup 52 is removed. The second cup 52 is then inverted from the position shown in FIG. 3A and is inserted into the first cup 50 in the manner shown in FIG. 3B. The second cup 52 is pushed down into the first cup 50 to separate the material being brewed (e.g., coffee grounds, tea leaves, etc.) from the brewed beverage by virtue of the filter 60. The lid 62 can then be placed on the top of the resulting double cup. The cups 50, 52 can be made short and wide (e.g., mug style).

Figure 4:
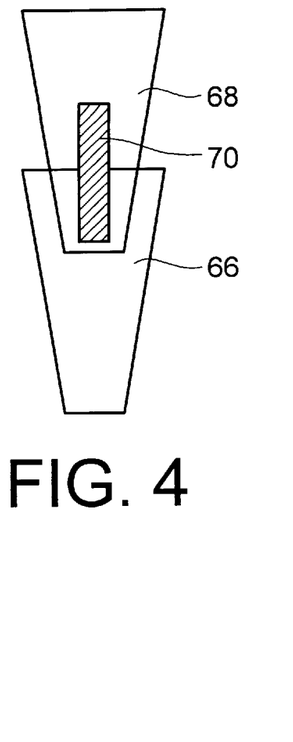
FIG. 4 is a side view of a filter press device according to another embodiment of the present invention.

A variation on the embodiment of the filter press device shown in FIG. 1A is illustrated in FIG. 4. The embodiment of the filter press device shown in FIG. 4 is substantially the same as that shown in FIG. 1A except that instead of providing the second cup 68 with an open bottom end that is covered with a filter, the FIG. 4 embodiment includes one or more slots cut into the sidewall of the second cup 68 that are covered with the filter material 70. The slot(s) covered with the filter material 70 extend along the longitudinal direction of the cup 68. The bottom end of the second cup 68 is thus closed.

In use, the material to be brewed (e.g., coffee grounds, tea leaves, etc.) is placed in the first cup 66 along with water for effecting brewing. The water can be hot when placed in the first cup 66 or can be heated after placement in the first cup 66. Once the material in the first cup 66 that is being brewed (e.g., coffee grounds, tea leaves, etc.) has had sufficient time to brew, the second cup 68 is pushed into the first cup 66. The brewed beverage flows through the filter 70 and the brewed beverage is thus separated from the material to be brewed that is originally placed in the first cup 66. It is to be understood that this version of the filter press device shown in FIG. 4 can also be used in the manner described above in connection with the FIG. 2 embodiment.

Figure 5:
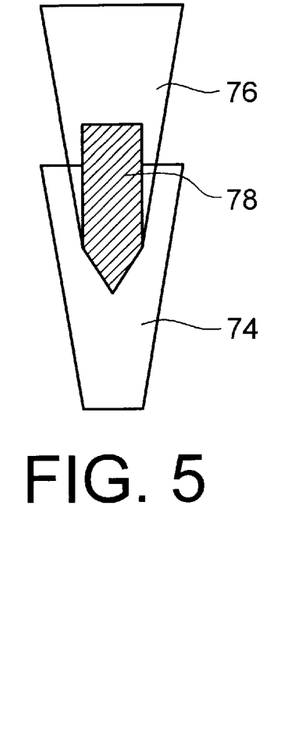
FIG. 5 is a side view of a filter press device according to a further embodiment of the present invention.

FIG. 5 illustrates another embodiment of the filter press device of the present invention in which the filter arrangements shown in FIG. 1A and FIG. 4 are combined. In this version shown in FIG. 5, the second cup or filter press cup 76 which is adapted to be placed within the first cup 74 is provided with an open bottom and slots cut into the sidewall of the second cup 76. A generally funnel shaped filter element 78 is secured to the second cup 76 to cover the open bottom end of the second cup as well as the slots in the sidewall of the second cup 76. It is of course also possible to utilize a filter material which, instead of being funnel shaped, covers the slots in the sidewall of the second cup and extends across the open bottom of the second cup in the same manner shown in FIG. 1A.

Figure 6:
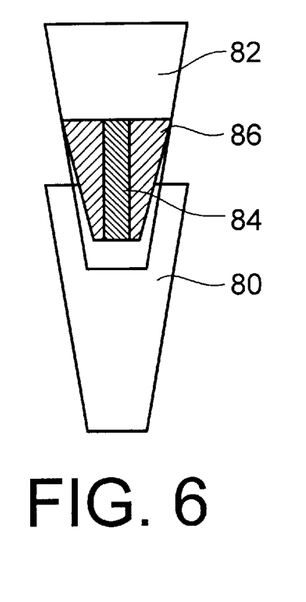
FIG. 6 is a side view of a filter press device according to another embodiment of the present invention.

The embodiments of the filter device shown in FIGS. 4 and 5 include slots in the sidewall of the second cup that are formed by completely removing portions of the sidewall of the second cup. It is possible, however, to form slots in the sidewall of the second container by cutting out portions of the sidewall of the second cup, but not completely removing the cut out portions of the sidewall. FIG. 6 illustrates such an embodiment in which portions 84 of the sidewall of the second cup 82 are partially cut out, but remain attached to the second cup along, for instance, a hinge area at the top of the cut out region. The filter material 86 can then be woven through these partially cut out regions and secured to the second cup 82. This embodiment of the filter press device shown in FIG. 6 can be used in the same manner as that described above in connection with the embodiment shown in FIGS. 1A and 1B in which water and the material to be brewed (e.g., coffee grounds, tea leaves, etc.) are placed in the first cup 80, with the second cup 82 then being pushed into the first cup 80 so that the brewed beverage flows through the filter material 86 and into the second cup 82.

Figure 7A:
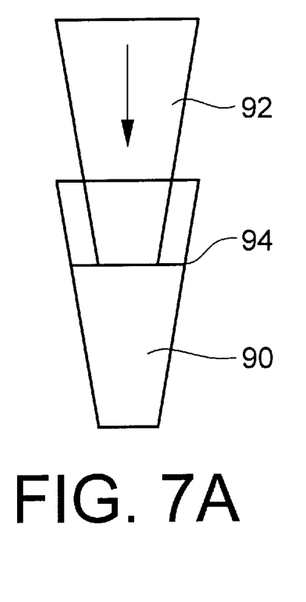
FIG. 7A is a side view of a filter press device according to another embodiment of the present invention.
Figure 7B:
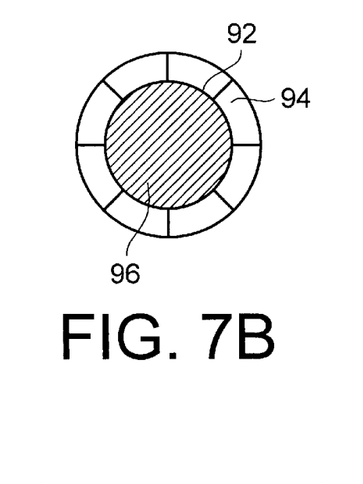
FIG. 7B is a bottom view of the second cup used in the filter press device illustrated in FIG. 7A.

FIGS. 7A and 7B illustrate another embodiment that is similar to the version depicted in FIG. 1A, except that the embodiment shown in FIGS. 7A and 7B is designed to help ensure that the material to be brewed that is originally placed in the first cup does not flow between the first and second cups during the filter press operation. As seen in FIGS. 7A and 7B, a second cup or filter press cup 92 is provided with an open bottom end and a filter 96 that extends across the open bottom end of the second cup 92 in a manner similar to that described above in connection with the version shown in FIG. 1A. The second cup 92 is adapted to be pushed into the first cup 90 after water and the material to be brewed (e.g., coffee grounds, tea leaves, etc.) has been placed in the first cup 90. This thus causes the brewed beverage to be separated from the material from which the brewed beverage is made. The second cup 92 also includes a radially outwardly extending flexible flange 94. In the illustrated version, this flexible flange 94 is located at the open bottom end of the second cup 92.

The flexible flange 94 is adapted to engage the inner surface of the first cup 90 as the second cup 92 is pushed into the first cup 90 to thereby prevent the material that is originally placed in the first cup 90 for purposes of making a brewed beverage (e.g., coffee grounds, tea leaves, etc.) from being displaced between the outer surface of the second cup 92 and the inner surface of the first cup 90 during the filter pressing operation. The flexible flange 94 can be provided with slits as generally shown in FIG. 7B that allow the flange 94 to flex slightly and accommodate the narrowing inner dimension of the first cup 90 as the second cup 92 is pushed into the first cup 90.

Figure 8A:
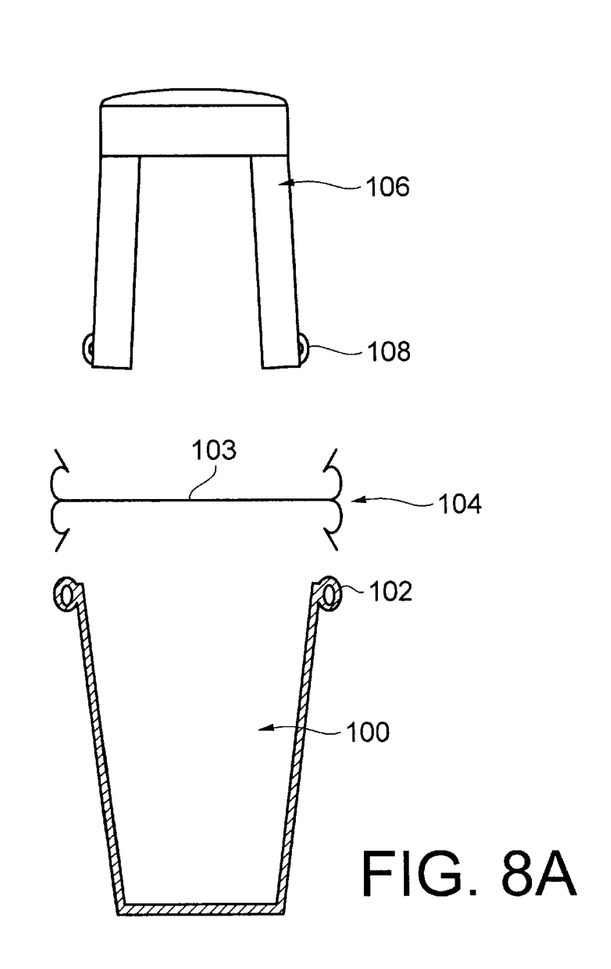
FIG. 8A is a side view of a filter press device according to a further embodiment of the present invention.
Figure 8B:
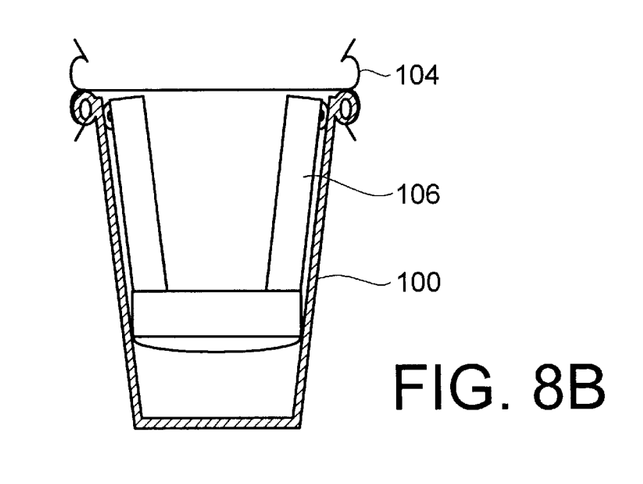
FIG. 8B is a side view of the filter press device depicted in FIG. 8A when the second cup is inserted into the first cup.

FIGS. 8A and 8B illustrate another embodiment of the filter press device according to the present invention. The filter press device shown in FIGS. 8A and 8B includes a first cup 100 that is adapted to receive the material to be brewed (e.g., coffee grounds, tea leaves, etc.) and water for brewing. The first cup 100 includes an upwardly extending side wall extending around the entire circumference of the cup 100 and a rim 102 located at the open upper end of the first cup 100.

The filter press device also includes a second cup or filter press cup 106 as well as a dual lid 104. The second cup 106 possesses an upstanding sidewall extending around the entire circumferential extent of the second cup 106. The dual lid 104 functions as a locking mechanism and is adapted to serve as a lid for both the first cup 100 as well as the second cup 106. The dual lid 104 is adapted to engage the rim 102 on the first cup 100 and the rim 108 on the second cup 106. In this way, the second cup 106 can be connected to the first cup 100, with the second cup 106 being in an inverted, bottom end up position so that the interior of the two cups 100, 106 face one another. The dual lid includes a central panel 103 that extends across the entire lid.

The entirety of the second cup or filter press cup 106 functions as the filter in this embodiment of the filter press device. That is, the second cup 106 is formed of a material throughout that functions as the filter for filtering the brewed beverage from the material from which the brewed beverage is made. The second cup or filter can be formed from any porous material made from suitable material such as ceramic, plastic, glass, metal or of material that can be made porous, for example fused particles in the form of spheres. It is possible, for example, to use a material which is in a sheet form and made of fused particles (e.g., micro spheres) of materials such as those mentioned immediately above. The material can then be used to form the cup so that the finished cup possesses porous characteristics without the need for thereafter forming holes in the cup. Thus, the second cup 106 can be provided with porous characteristics at the time the cup 106 is fabricated.

In use, the filter press cup 106 and the dual lid 104 are removed from the first cup 100, and the material to be brewed (e.g., coffee grounds, tea leaves, etc.) is placed in the first cup 100. Water is also placed in the first cup 100 to brew the material. The water that is placed in the first cup 100 can be hot, or can be heated after it is placed in the first cup, for example through microwave heating. While the material is brewing in the first cup 100, the dual lid 104 can be fitted to the top of the first cup 100 with the filter press cup 106 fitted to the dual lid 104 in the bottom end up orientation shown in FIG. 8A. In this way, the filter press cup 106 serves as a lid for the first cup 100 during the brewing process. Once the brewing process is completed, the dual lid 104 and the filter press cup 106 are separated from the first cup 100. The filter press cup or second cup 106 is then inverted and pushed into the first cup 100. As the filter press cup 106 is pushed downwardly into the first cup 100, the brewed beverage flows into the interior of the second cup 106 while the material originally placed in the first cup 100 for brewing remains in the bottom of the first cup 100. The dual lid 104 can be secured to the rim 102 of the first cup 100 or can simply be discarded. Attachment of the dual lid to the first cup 100 would provide the cup with a lid to avoid spilling the brewed beverage, e.g., while walking.

The embodiment of the present invention illustrated in FIGS. 8A and 8B offers the advantage of being more aesthetically pleasing than drinking coffee from a cup that has another cup placed within it that may contaminate the coffee taste. The material forming the filter press cup 106 can be formed with different porosity levels that allow various liquid flow rates to pass through the filter. Further, in this embodiment, the entire filter press cup 106 serves as a filter rather than just the bottom of the cup or portions of the side wall of the cup. In addition, as illustrated in FIG. 8A and 8B, the bottom of the filter press cup 106 can be formed convex to allow proper wetting of the filter and immediate flow through the filter rather than up the tapered side wall and potentially over the top of the cup. A filter press cup 106 formed from material such as those mentioned above would also be relatively rigid, thus increasing the cup side wall strength with the filter press cup 106 sized and configured to closely match the size and configuration of the first cup 100.

Figure 9A:
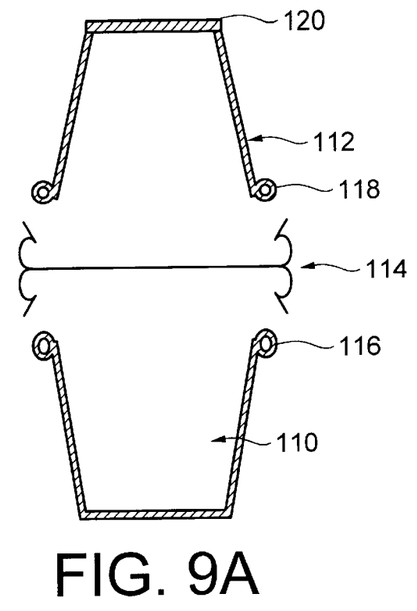
FIG. 9A is a side view of a filter press device according to another embodiment of the present invention.
Figure 9B:
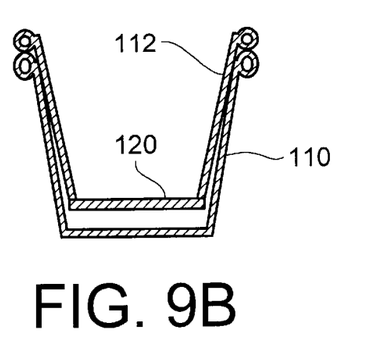
FIG. 9B is a side view of the filter press device depicted in FIG. 9A when the second cup is inserted into the first cup.

FIGS. 9A and 9B represent a slightly modified version of the embodiment of the filter press device illustrated in FIGS. 8A and 8B. In the embodiment shown in FIGS. 9A and 9B, the filter press device includes a first cup 110, a second cup or filter press cup 112 and a dual lid 114. The dual lid 114 is adapted to engage the rim 116 provided on the top of the first cup 110 as well as the rim 118 provided on the top of the second cup 112. The second cup 112 includes an upstanding sidewall extending around the entire circumference of the second cup 112 and an open bottom. A filter 120 is secured to the second cup 112 and extends across the open bottom end of the second cup 112. As illustrated in FIG. 9A, the dual lid 114 is adapted to be connected to the rim 116 of the first cup 110, with the rim 118 of the second cup 112 being connected to the dual lid 114 so that the second cup 112 is in an inverted, bottom end up position.

In use, the dual lid 114 is removed from the first cup 110 and the material to be brewed (e.g., coffee grounds, tea leaves, etc.) is placed in the first cup 110 along with water. The water can be hot when placed in the first cup 110 or can be heated subsequent to being placed in the first cup 110. During the brewing process, the dual lid 114 with the attached second cup 112 can be secured to the rim 116 of the first cup 110 so that the second cup 112 functions as a lid for the first cup. Once the brewing process is completed, the dual lid 114 is removed from the first cup 110 and the second cup 112 is separated from the dual lid 114. Then, as illustrated in FIG. 9B, the second cup or filter press cup 112 is inverted and pushed into the first cup 110 to separate the brewed beverage from the material from which the brewed beverage is made. That is, as the press filter cup 112 is pushed into the first cup 110, the brewed beverage flows through the filter 120 while the material from which the brewed beverage has been made (e.g., coffee grounds, tea leaves, etc.) remain in the bottom of the first cup 110. As described above, the dual lid 114 can be used as a lid after the second cup 112 has been pushed into the first cup 110.

Figure 10A:
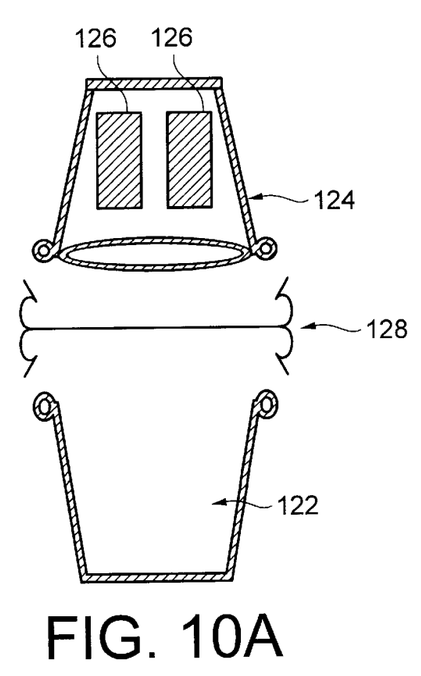
FIG. 10A is a side view of a filter press device according to a further embodiment of the present invention.
Figure 10B:
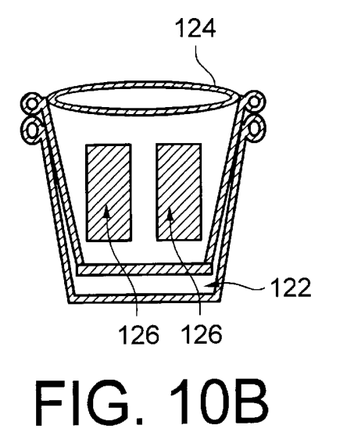
FIG. 10B is a side view of the filter press device depicted in FIG. 10A when the second cup is inserted into the first cup.

The embodiment of the filter press device illustrated in FIGS. 10A and 10B is substantially the same as the embodiment illustrated in FIGS. 9A and 9B, except that instead of providing the filter press cup with an open bottom end covered with a filter, the embodiment shown in FIGS. 10A and 10B includes a second cup or filter press cup 124 having slots or cut outs provided in the upstanding sidewall of the second cup 124. These slots or cut outs are covered by respective filters 126, or a single filter can be provided that covers all of the slots. Once again, a dual lid 128 is provided for connecting the second cup 124 to the first cup 122 in an inverted bottom end up orientation.

The first cup 122 is adapted to receive the material to be brewed (e.g., coffee grounds, tea leaves, etc.) along with water that is either hot at the time of addition to the first cup 122 or that is subsequently heated after placement in the first cup 122. The dual lid 128 can be attached to the first cup 122 with the second cup 124 attached to the dual lid so that the second cup 124 serves as a lid for the first cup 122 during brewing. After the brewing process is completed, the dual lid 128 is removed and the second cup 124 is inverted and pushed into the first cup 122 so that the brewed beverage flows through the filters 126 in the sidewall of the press filter cup 124. As in the case of the other embodiments described above that are used in the same manner, the brewed beverage can then be consumed directly from the resulting double brim cup, and the dual lid 128 can be used as a lid once the second cup 124 is pushed into the first cup 122.

Figure 11A:
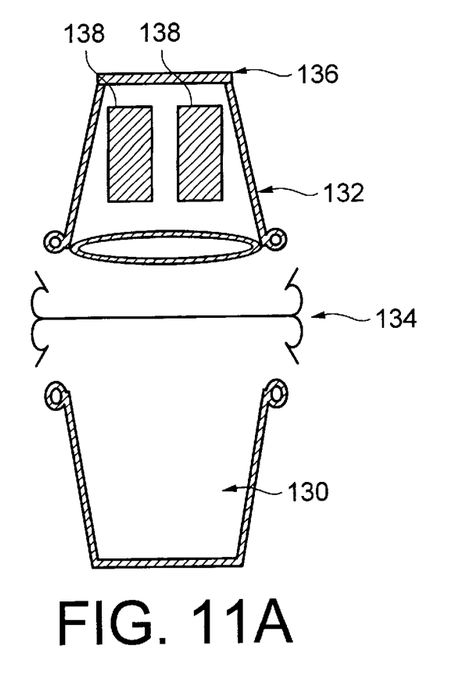
FIG. 11A is a side view of a filter press device according to a further embodiment of the present invention.
Figure 11B:
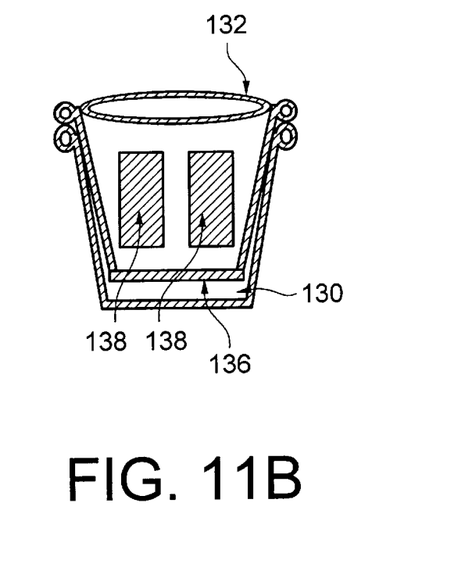
FIG. 11B is a side view of the filter press device depicted in FIG. 11A when the second cup is inserted into the first cup.

The version of the filter press device according to the present invention as illustrated in FIGS. 11A and 11B represents a combination of the embodiment illustrated in FIGS. 9A and 9B and the embodiment illustrated in FIGS. 10A and 10B. In this embodiment, the second cup or filter press cup 132 is provided with an open bottom end that is covered with a filter 136. In addition, a plurality of slots or cut outs are provided in the sidewall of the second cup 132, with such slots or cut outs being covered with a filter 138. A dual lid 134 is also provided for connecting the second cup 132 in an inverted, bottom end up orientation with respect to the first cup 130. The use of this version of the filter press device is the same as that described above in connection with the embodiments shown in FIGS. 9A, 9B, 10A, 10B. That is, once the brewing of the material in the first cup 130 has been completed, the dual lid 134 and the second cup 132 are removed from the first cup 130, with the second cup 132 being inverted and pushed into the first cup 130. As the second cup 132 is pushed into the first cup 130, the brewed beverage flows through the filter 136 at the bottom end of the cup as well as through the filter 138 in the sidewall of the second cup 132.

Figure 12A:
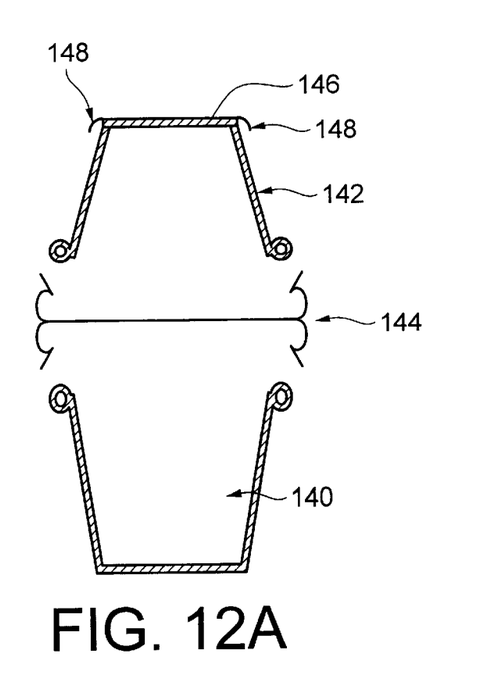
FIG. 12A is a side view of a filter press device according to a further embodiment of the present invention.
Figure 12B:
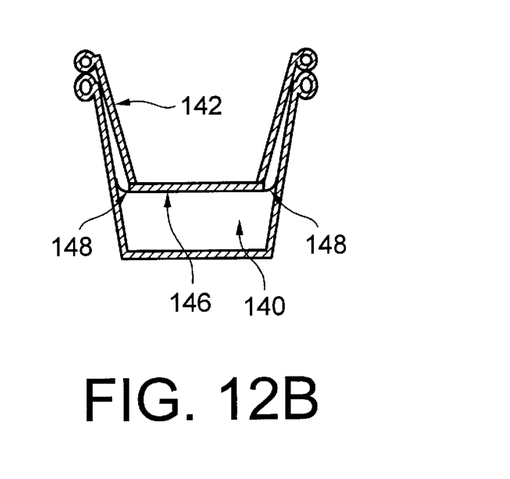
FIG. 12B is a side view of the filter press device depicted in FIG. 12A when the second cup is inserted into the first cup.

FIGS. 12A and 12B illustrate another embodiment of the filter press device of the present invention that is substantially the same as the embodiment illustrated in FIGS. 9A and 9B except that in the embodiment illustrated in FIGS. 12A and 12B, an annular flexible flange 148 is provided at the bottom of the second cup or filter press cup 142. In the illustrated embodiment shown in FIGS. 12A and 12B, the annular flexible flange 148 is provided as an outward extension of the filter 146 that covers the open bottom end of the second cup 142. As in several of the earlier described embodiments, this version of the filter press device also includes a dual lid 144 for connecting the second cup 142 to the first cup 140 in such a manner that the second cup 142 is initially in an inverted, bottom end up position. In this way, the second cup 142 can function as a lid for the first cup 140 during the brewing of the coffee grounds, tea leaves or the like in the first cup 140. Once the brewing process is completed, the dual lid 144 and the second cup 142 are removed from the first cup 140, and the second cup 142 is inverted and pushed into the first cup 140 as illustrated in FIG. 12B. As the second cup or filter press cup 142 is pushed into the first cup 140, the flexible flange 148 engages the interior of the sidewall of the first container 140. As the brewed beverage passes through the filter 146 covering the open bottom end of the second cup 142, the flexible flange 148 engages the inner surface of the sidewall of the first container 140 to prevent the coffee grounds, tea leaves or the like from being pushed upwardly between the outer surface of the second cup 142 and the inner surface of the first cup 140.

Figure 13A:
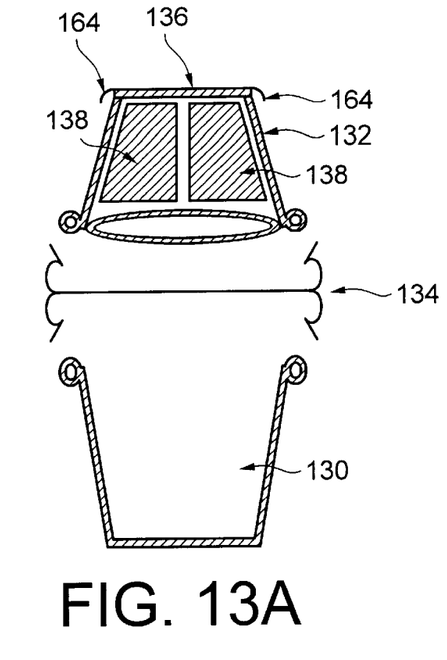
FIG. 13A is a side view of a filter press device according to another embodiment of the present invention.
Figure 13B:
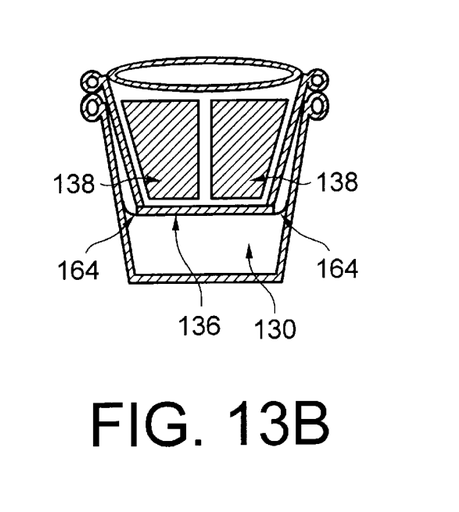
FIG. 13B is a side view of the filter press device depicted in FIG. 13A when the second cup is inserted into the first cup.

The embodiment of the filter press device according to the present invention as illustrated in FIGS. 13A and 13B is substantially the same as that illustrated in FIGS. 11A, 11B with corresponding parts being provided with the same reference numerals, except that in addition, an annular flexible flange 164 is provided at the bottom end of the second cup 132. This annular flexible flange 164 functions in the same way as the flexible flange described above and illustrated in FIGS. 12A and 12B.

Figure 14A:
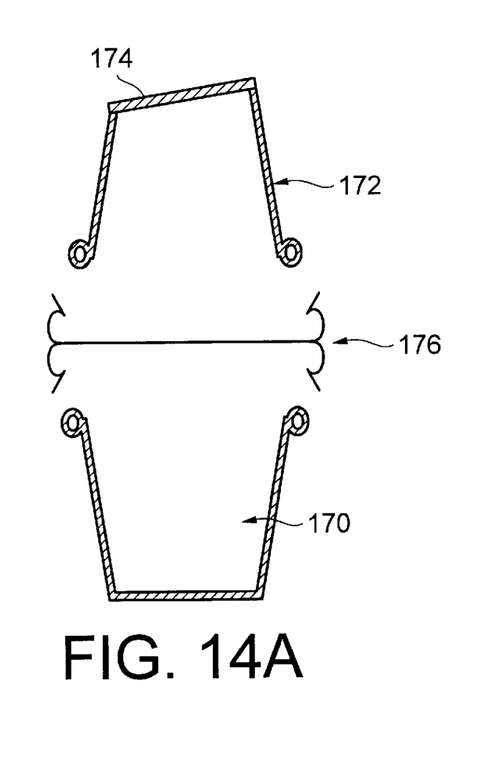
FIG. 14A is a side view of a filter press device according to a further embodiment of the present invention.
Figure 14B:
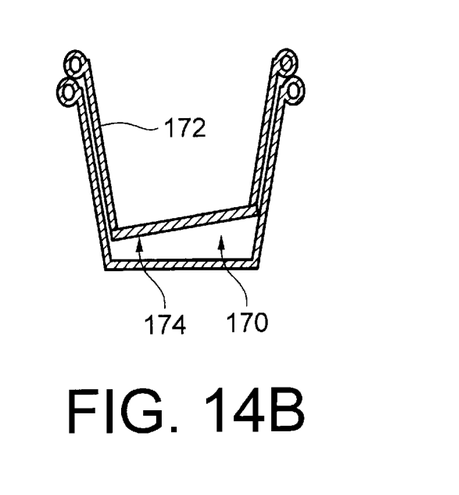
FIG. 14B is a side view of the filter press device depicted in FIG. 14A when the second cup is inserted into the first cup.

FIGS. 14A and 14B illustrate a slightly modified version of the embodiment of the filter press device illustrated in FIGS. 9A and 9B. In the embodiment shown in FIGS. 14A, 14B, the filter press device includes the first cup 170, the second cup or filter press cup 172, and the dual lid 176. The open bottom end of the second cup 172 is covered with a filter 174. This version of the filter press device differs from that shown in FIGS. 9A and 9B in that the bottom end of the second cup 172 is configured so that the filter 174 is inclined. This can be achieved by forming the bottom end of the second container 172 at an angle. By providing an inclined bottom end on the second cup 172, the surface area of the filter 174 is slightly larger than in the embodiment illustrated in FIGS. 9A and 9B, thus providing a slight increase in flow through capability for the brewed beverage when the second cup 172 is pushed into the first cup 170 in the manner illustrated in FIG. 14B.

Figure 15A:
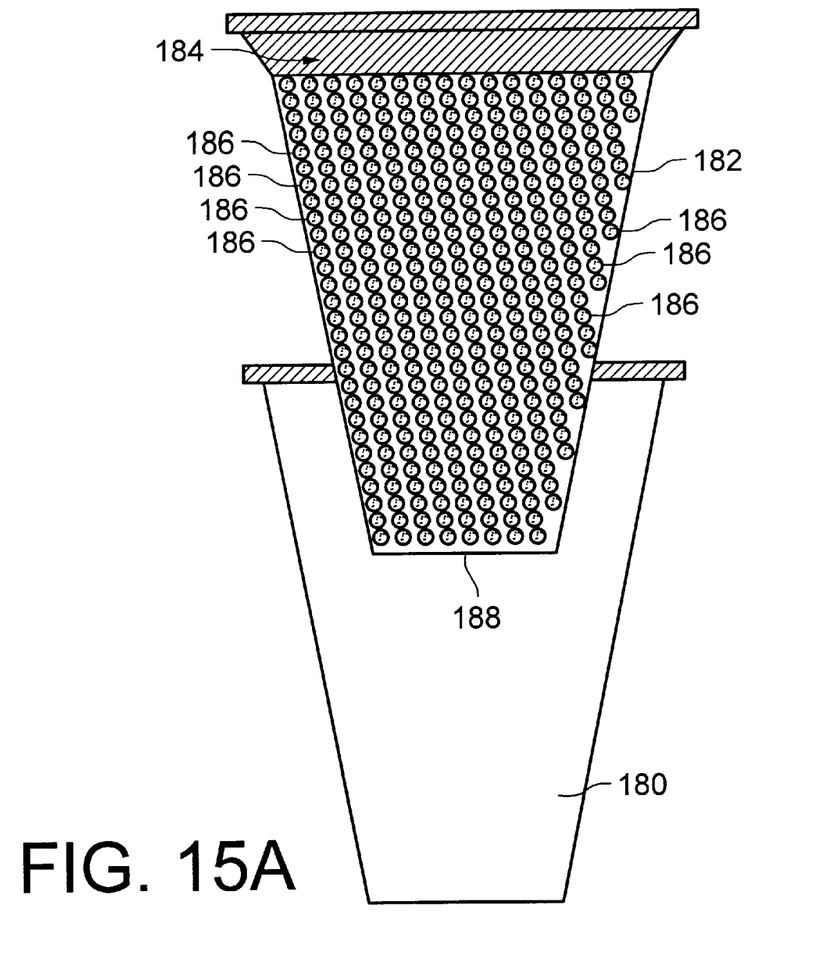
FIG. 15A is a side view of a filter press device according to one embodiment of the present invention.
Figure 15B:
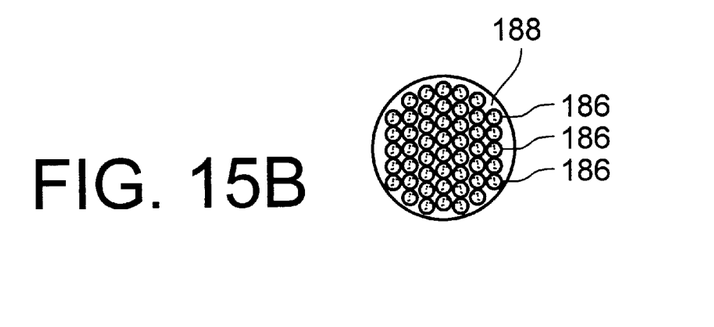
FIG. 15B is a bottom view of the second cup used in the filter press device illustrated in FIG. 15A.

FIGS. 15A and 15B illustrate another version of the filter press device according to the present invention. This embodiment of the filter press device includes a first cup 180 that is adapted to receive the material to be brewed (e.g., coffee grounds, tea leaves, etc.) and water. In addition, a second cup or filter press cup 182 is adapted to be pushed into the first cup 180 during press filtering. This second cup 182 possesses a sidewall extending around the entire circumferential extent of the second cup 182. The second cup 182 is provided with a plurality of through holes 186 distributed throughout the sidewall of the second cup 182. Additionally, the bottom wall 188 forming a closed bottom end of the second cup 182 is provided with a plurality of through holes 186 as shown in FIG. 15B.

In addition, near the upper end of the second cup 182, the side wall of the second cup 182 is angled outwardly slightly to provide a seal area 184 that is adapted to cooperate with the upper end of the first container 180 to provide an effective seal between the first and second cups 180, 182 when the second cup 182 is pushed into the first cup 180 to its full extent. This seal area 184 forms an angle with the remainder of the sidewall of the second cup 182 (i.e., the seal area 184 is preferably not a straight line continuation of the sidewall, but is angled outwardly relative to the sidewall of the second cup 182). The seal area 184 can also be made of a material different from the remainder of the sidewall of the second cup 182 and can be specifically selected to provide an effective liquid tight seal with the upper end of the first cup 180. One possible material for use in fabricating the seal area 184 is the foamed material described in U.S. Patent No. 4,435,344. Suitable materials also include foamed polyethylene, foamed inks and thermoplastic material. Although not specifically shown in FIG. 15A, a dual lid similar to that illustrated in the preceding embodiments can also be employed to initially connect the second cup 182 to the first cup 180 in an inverted bottom end up orientation with respect to the first cup 180 and to serve as a lid thereafter.

The material to be brewed (e.g., coffee grounds, tea leaves, etc.) is placed in the first cup 180 along with water. The water can be either hot when placed in the first cup 180 or subsequently heated after placement in the first cup 180. Once the brewing process is completed, the second cup 182 is pushed into the first cup 180 so that the brewed beverage flows through the holes 186 in the bottom wall and the sidewall of the second cup 182. Once the second cup 182 is pushed into the first cup 180 to the full extent, the seal area 184 on the upper end of the second cup 182 engages the upper end of the first cup 180 to provide a liquid tight seal. This helps further prevent contents within the first cup 180 from flowing between the outer surface of the second cup 182 and the inner surface of the first cup 180.

Figure 16A:
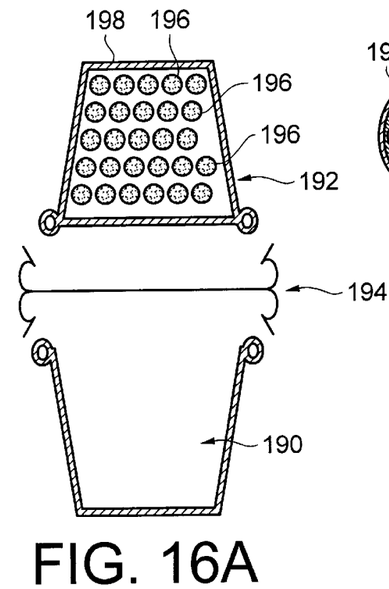
FIG. 16A is a side view of a filter press device according to one embodiment of the present invention.
Figure 16B:
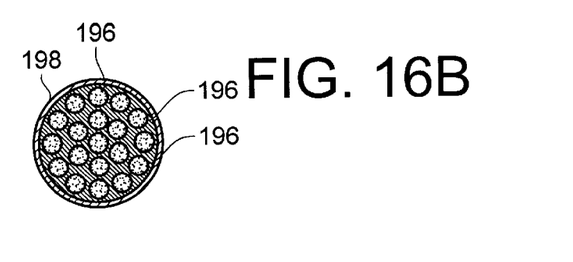
FIG. 16B is a bottom view of the second cup used in the filter press device illustrated in FIG. 16A.
Figure 16C:
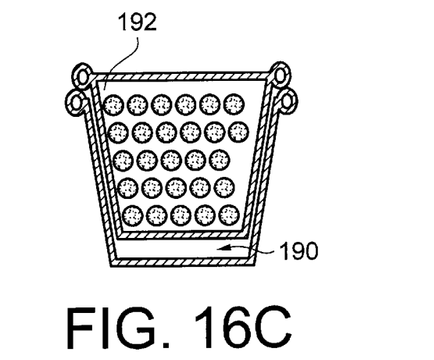
FIG. 16C is a side view of the filter press device depicted in FIG. 16A when the second cup is inserted into the first cup.

FIGS. 16A, 16B and 16C illustrate a slightly modified version of the embodiment of the filter press device illustrated in FIGS. 15A and 15B. This embodiment of the filter press device shown in FIGS. 16A, 16B and 16C includes a first cup 190 that is adapted to receive the material to be brewed (e.g., coffee grounds, tea leaves, etc.) and the water used for brewing. The filter press device also includes a second cup or press filter cup 192 and a dual lid 194 that is adapted to be connected to the rim at the top of the first cup 190 and the rim at the top of the second cup 192 so that the second cup 192 can be placed on the first cup 190 in the inverted bottom end up orientation shown in FIG. 16A. The second cup 192 can thus function as a lid for the first cup 190 during the brewing process. The second cup 192 is provided with a plurality of through holes 196 distributed throughout the sidewall of the second cup 192. The closed bottom end 198 of the second cup 192 is also provided with a plurality of through holes as illustrated in FIG. 16B. In this embodiment of the filter press device, the through holes 196 can be slightly larger than in the embodiment illustrated in FIGS. 15A and 15B. The size of the through holes 196 and the though holes shown in the embodiment of FIGS. 15A and 15B can be selected to optimize the separation of the brewed beverage from the material remaining in the cup.

Once the brewing of the material in the first cup 190 has been completed, the dual lid 194 and the second cup 192 are separated from the first cup 190. The second cup 192 is then inverted and pushed into the first cup 190 in the manner illustrated in FIG. 16C. The brewed beverage is able to flow through the through holes 196 in the bottom wall and the sidewall of the second cup 192 to thereby separate the brewed beverage from the remaining material. The brewed beverage can then be consumed directly from the double brim cup, with the dual lid 194 being used as a lid to cover the double brim cup as in the case of the other embodiments employing the dual lid.

In the embodiments of the filter press device shown in FIGS. 15A, 15B, 15C, 15D, the through holes in the second cup that function to separate the brewed beverage are formed by forming holes in the second cup. That is, the second cup can be a conventional paper cup in which through holes have been formed by an appropriate means.

Figure 17A:
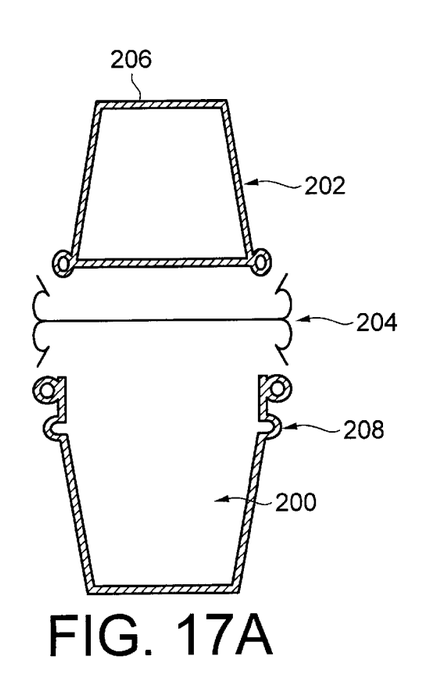
FIG. 17A is a side view of a filter press device according to a still further embodiment of the present invention.
Figure 17B:
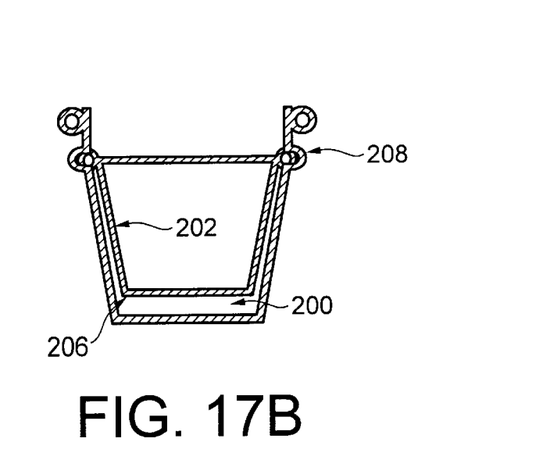
FIG. 17B is a side view of the filter press device depicted in FIG. 17A when the second cup is inserted into the first cup.

Another embodiment of the filter press device according to the present invention is illustrated in FIGS. 17A and 17B. This embodiment of the filter press device includes a first cup 200, a second cup or filter press cup 202, and a dual lid 204. The dual lid 204 functions in the same manner as that described previously in that it allows the second cup 202 to be connected to the first cup 200 in the inverted, bottom end up orientation shown in FIG. 17A. The bottom end of the second cup 202 is open and this open bottom end of the second cup 202 is covered with a filter 206. In addition, spaced slightly below the rim at the upper end of the first cup 200 is an outwardly directed annular protuberance 208 that forms an inwardly facing annular groove. This annular groove formed by the protuberance 208 is adapted to receive the rim on the upper end of the second cup 202 when the second cup 202 is pushed into the first cup 200.

In use, the material to be brewed (e.g., coffee grounds, tea leaves, etc.) is placed in the first cup 200 along with water for brewing. The water can be either hot when placed in the first cup 200 or can be subsequently heated. The dual lid 204 attached to the rim at the upper end of the second cup 202 can be connected to the rim at the top end of the first cup 202 so that the second cup 202 in the inverted position functions as a lid for the first cup 200 during the brewing process. Once the brewing process is completed, the dual lid 204 and the second cup 202 are separated from the first cup 200. The second cup 202 is then inverted and pushed into the first cup 200 in the manner illustrated in FIG. 17B. As the second cup 202 is pushed into the first cup 200, the brewed beverage flows through the filter 206 and is thus separated from the material originally placed in the first cup 200. Additionally, as the second cup 202 is pushed into the first cup 200, the rim at the top end of the second cup 202 engages the annular groove formed by the annular protuberance 208 in the first cup 200, thereby securing the second cup 208 within the first cup 200.

This embodiment is highly advantageous as it helps ensure that the second cup 202 is secured with respect to the first cup 200 to facilitate consumption of the beverage from the dual cup. Also, material in the bottom of the first cup 200 that has been separated from the brewed beverage is prevented from flowing upwardly between the side walls of the first and second cups.

Figure 18A:
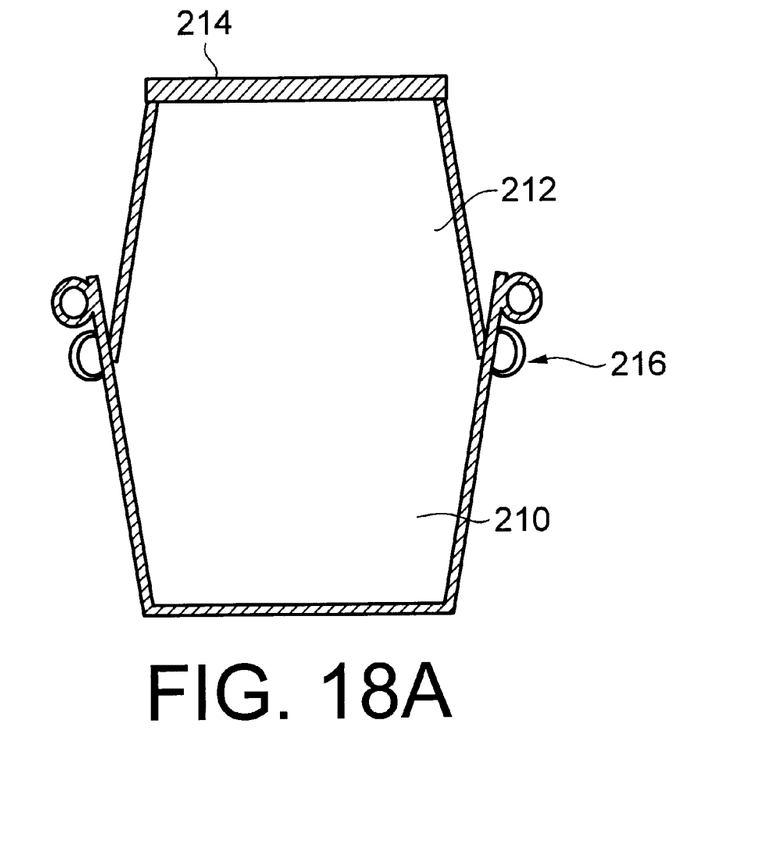
FIG. 18A is a side view of a filter press device according to a further embodiment of the present invention.
Figure 18B:
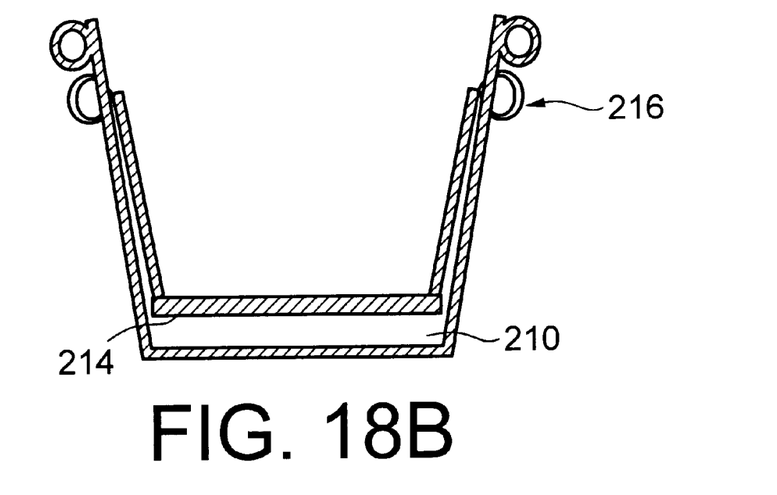
FIG. 18B is a side view of the filter press device depicted in FIG. 18A when the second cup is inserted into the first cup.

FIGS. 18A and 18B illustrate a slightly modified version of the filter press device shown in FIGS. 17A and 17B. The embodiment of the filter press device shown in FIGS. 18A and 18B does away with the need for the dual lid 204. In this embodiment, the upper end of the sidewall of the first cup 210 is provided with an annular protuberance 216 forming an inwardly facing annular groove that is adapted to receive the rim at the top end of the second cup or filter press cup 212. As illustrated, the bottom end of the second cup 212 is open, and this open end of the second cup 212 is covered with a filter 214.

The material to be brewed (e.g., coffee grounds, tea leaves, etc.) is placed in the first cup 210 along with the water required for brewing. The water can be either hot when placed in the first cup 210 or can be subsequently heated. The second cup 212 can then be placed on top of the first cup 210 by engaging the upper rim of the second cup 212 with the annular groove on the sidewall of the first cup 210 as shown in FIG. 18A. The second cup 212 thus serves as a lid for the first cup 210 during the brewing process.

Once the brewing process is completed, the second cup 212 is separated from the first cup 210 and is inverted and pushed into the first cup 210 in the manner illustrated in FIG. 18B. As the second cup 212 is pushed into the first cup 210, the brewed beverage flows through the filter 214 while the remaining material in the bottom of the first cup 210 remains in the bottom of the first cup. The rim on the top end of the second cup 212 eventually engages the annular groove on the sidewall of the first cup 210 to thus secure the second cup 212 relative to the first cup 210. The material remaining in the bottom of the first cup 210 is prevented from flowing upwardly beyond the area where the rim on the second cup 212 engages the annular groove on the sidewall of the first container 210.

In the various embodiments of the cup described above which utilize a filter press operation in which the second cup is pushed into the first cup to separate the brewed beverage from the material to be brewed that is originally placed in the first cup, the second cup and the first cup are of the same or substantially the same size and configuration, including sidewalls that are sized and configured to be the same or substantially the same. Also, the second cup possesses a sidewall that extends throughout the entire circumferential extent of the second cup. Thus, when the second cup is pushed into the first cup, the sidewall of the second cup supports the first cup and provides a stronger beverage consuming construction. This double brim construction also improves the insulating properties of the resulting cup. The filter press device of the present invention is also highly useful in that it is designed to provide a one-time, single serving filter pressed beverage that can be disposed after use. The filter press device can thus be made relatively inexpensively, for example using conventional disposable paper cups for both the first and second cups. With conventional disposable paper cups, the inside cup is poly coated on both sides (i.e., the inside and the outside) and the outer cup is poly coated on the inside.

It is understood that other variations of the filter press device are possible. For example, embodiments of the filter press device such as that shown in FIGS. 9A and 9B can be used in a manner similar to that illustrated in FIG. 2. That is, rather than placing the material to be brewed in the first cup, the second cup can be placed within the first cup and the material to be brewed, along with water, subsequently placed in the second cup. Once the brewing process is completed, the second cup can then be removed with the brewed beverage remaining in the first cup for consumption.

The present invention provides a variety of advantages including taste improvement over conventional drip brewed coffee, substantial coffee ground or tea leaf separation from the brewed beverage, spill proof closure of the brewed beverage cup, and improved insulation and handleability during and after brewing. Also provided is a desirable drink through double structure made from paper. The filter press brewing system of the present invention also enables a full flavor extraction from the grounds or leaves. The present invention further provides single-cup brewing, disposability and convenience.

The principles, preferred embodiments and operation modes of the present invention have been described in the foregoing specification. However, the invention which is intended to be protected is not to be construed as limited to the particular embodiments disclosed herein. Further, the embodiments described herein are to be regarded as illustrative rather than restrictive. Variations and changes may be made by others without departing from the spirit of the present invention. Accordingly, it is expressly intended that all such variations and changes fall within the spirit and scope of the present invention and are embraced thereby.

What is claimed is:

1. A disposable filter press device for making a brewed beverage from a combination of liquid and material to be brewed, comprising:

a first disposable cup having a closed bottom, an open top and a sidewall extending around an entire circumferential extent of the first cup;

a second disposable cup having a bottom end, an open top and a sidewall extending around the entire circumferential extent of the second cup, the sidewall of said second cup being sized and configured substantially the same as the sidewall of said first cup so that said second cup is positionable in said first cup, said second cup including a filter for separating the brewed beverage from the material that is used to brew the brewed beverage by moving the second cup relative to the first cup; and means for connecting said second cup to said first cup with said second cup being in an inverted, bottom end up position.

2. The disposable filter press device according to claim 1, wherein said means for connecting includes a dual lid that is connectable to a rim adjacent the top of the first cup and a rim adjacent the top of the second cup.

3. The disposable filter press device according to claim 1, wherein said means for connecting includes the sidewall of the first cup being provided with a groove that receives a rim portion of the second cup that is located adjacent the top of the second cup.

4. The disposable filter press device according to claim 1, wherein the bottom of said second cup is open and said filter includes a filter extending across the open bottom of the second cup.

5. The disposable filter press device according to claim 4, wherein the bottom of said second cup is inclined relative to a longitudinal axis of said second cup.

6. The disposable filter press device according to claim 1, wherein the sidewall of the second cup includes at least one cut out portion and said filter includes a filter extending across the at least one cut out portion.

7. The disposable filter press device according to claim 1, wherein the sidewall of the second cup includes a plurality of spaced apart cut out portions and said filter includes a filter extending across the cut out portions.

8. The disposable filter press device according to claim 1, wherein the filter includes a plurality of through holes distributed in the sidewall of said second cup.

9. The disposable filter press device according to claim 8, wherein said second cup is a paper cup.

10. The disposable filter press device according to claim 8, wherein said second cup includes a closed bottom, the filter also including a plurality of through holes distributed throughout the bottom of said second cup.

11. The disposable filter press device according to claim 1, wherein said second cup includes a closed bottom, the filter including a plurality of through holes distributed throughout the bottom of said second cup.

12. The disposable filter press device according to claim 1, including a flange extending outwardly from the bottom of said second cup for engaging an inner surface of the sidewall of said first cup when said second cup is pushed into said first cup.

13. The disposable filter press device according to claim 1, wherein said second cup is formed of a material having pores.

14. The disposable filter press device according to claim 1, wherein said first cup is adapted to receive the material used to brew the brewed beverage, and said second cup is adapted to be pushed into said first cup to separate the brewed beverage from the material that is used to brew the brewed beverage.

15. The disposable filter press device according to claim 1, wherein said second cup is adapted to receive the material used to brew the brewed beverage and is adapted to be pulled out of said first cup to separate the brewed beverage from the material that is used to brew the brewed beverage.

16. The disposable filter press device according to claim 1, wherein the first and second cups are sized f- producing a single serving of brewed beverage.

17. A disposable filter press device for making a brewed beverage from a combination of liquid and material to be brewed, comprising:

a first disposable cup having a closed bottom, an open top and a sidewall extending around an entire circumferential extent of the first cup;

a second disposable cup having a bottom end, an open top and a sidewall extending around the entire circumferential extent of the second cup, at least a portion of the sidewall of said second cup being sized and configured substantially the same as the sidewall of said first cup so that said second cup is positionable in said first cup, said second cup including a filter for separating the brewed beverage from the material that is used to brew the brewed beverage by moving the second cup relative to the first cup, an upper portion of the sidewall of the second cup being angled outwardly relative to an adjoining portion of the sidewall of the second cup to define a seal area that cooperates with an upper end of the first cup when the second cup is positioned within the first cup to provide a seal between the first and second cups, the second cup also including a rim situated above and enlarged relative to the outwardly angled upper portion of the sidewall.

18. The disposable filter press device according to claim 17, wherein the filter includes a plurality of through holes distributed in the sidewall of said second cup.

19. The disposable filter press device according to claim 17, wherein said second cup includes a closed bottom, the filter including a plurality of through holes distributed throughout the bottom of said second cup.

20. The disposable filter press device according to claim 17, wherein said second cup is formed of a material having pores.

21. The disposable filter press device according to claim 17, wherein the upper portion of the sidewall of the second cup that is angled outwardly is formed of a material different from the adjoining portion of the sidewall of the second cup.

22. A disposable filter press device for making a brewed beverage from a combination of liquid and material to be brewed, comprising:

a first disposable cup having a closed bottom, an open top and a sidewall extending around an entire circumferential extent of the first cup;

a second disposable cup having a bottom end, an open top and a sidewall extending around the entire circumferential extent of the second cup, at least a portion of the sidewall of said second cup being sized and configured substantially the same as the sidewall of said first cup so that said second cup is positionable in said first cup, said second cup including a filter for separating the brewed beverage from the material that is used to brew the brewed beverage by moving the second cup relative to the first cup, an upper portion of the sidewall of the second cup being angled outwardly relative to an adjoining portion of the sidewall of the second cup to define a seal area that cooperates with an upper end of the first cup when the second cup is positioned within the first cup to provide a seal between the first and second cups, the upper portion of the sidewall of the second cup that is angled outwardly being made of a material that is different from the material of which the adjoining portion of the sidewall is made.

23. The disposable filter press device according to claim 22, wherein said second cup includes a closed bottom, the filter including a plurality of through holes distributed throughout the bottom of said second cup.

24. The disposable filter press device according to claim 22, wherein said second cup is formed of a material having pores.

25. The disposable filter press device according to claim 22, wherein the filter includes a plurality of through holes distributed in the sidewall of said second cup.

* * * * *